United States Patent
Deorha et al.

(10) Patent No.: US 11,960,528 B1
(45) Date of Patent: Apr. 16, 2024

(54) SYSTEMS FOR DETERMINING IMAGE-BASED SEARCH RESULTS

(71) Applicant: AMAZON TECHNOLOGIES, INC., Seattle, WA (US)

(72) Inventors: Aditya Deorha, Mountain View, CA (US); Xiaofan Lin, Palo Alto, CA (US); Shashank Shekhar, Santa Clara, CA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

(21) Appl. No.: 17/937,132

(22) Filed: Sep. 30, 2022

(51) Int. Cl.
*G06F 16/532* (2019.01)
*G06F 16/538* (2019.01)
*G06F 16/583* (2019.01)

(52) U.S. Cl.
CPC .......... *G06F 16/532* (2019.01); *G06F 16/538* (2019.01); *G06F 16/5846* (2019.01)

(58) Field of Classification Search
CPC ... G06F 16/532; G06F 16/538; G06F 16/5846
See application file for complete search history.

(56) References Cited

U.S. PATENT DOCUMENTS

| | | |
|---|---|---|
| 2005/0234896 A1 | 10/2005 | Shima et al. |
| 2007/0067345 A1 | 3/2007 | Li et al. |
| 2009/0287655 A1* | 11/2009 | Bennett .................. G06F 16/58 |
| 2010/0017290 A1 | 1/2010 | Matsui |
| 2011/0179021 A1 | 7/2011 | Wen et al. |
| 2020/0356592 A1 | 11/2020 | Yada et al. |

\* cited by examiner

*Primary Examiner* — Baoquoc N To
(74) *Attorney, Agent, or Firm* — Lindauer Law, PLLC

(57) ABSTRACT

When a first search query including an image of an item is received to search for items associated with similar images, a second search query that includes text based on the image is generated. The text may be based on previous queries associated with the depicted item, visual features of the image, or text that is present in the image. The results from the first search query are scored based on their correspondence with the image of the item. Results having a score greater than a threshold are presented first in the output, followed by a selected number of results from the second search query. Results from the first search query that are associated with a score less than the threshold may be presented after the results from the second search query. This presentation increases the likelihood that items presented earlier in the output are relevant to the initial query.

20 Claims, 5 Drawing Sheets

SYSTEMS FOR DETERMINING IMAGE-BASED SEARCH RESULTS

BACKGROUND

Some search engines, online stores, or other types of websites perform image-based searches using input images provided by a user (e.g., an image-based search query). For example, a user that is searching for a specific item or type of item to purchase from an online store may acquire an image of the item and submit a search query that includes the image. In many cases, only a small number of search results may be determined based on a received image, or one or more search results that are determined may not be relevant.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
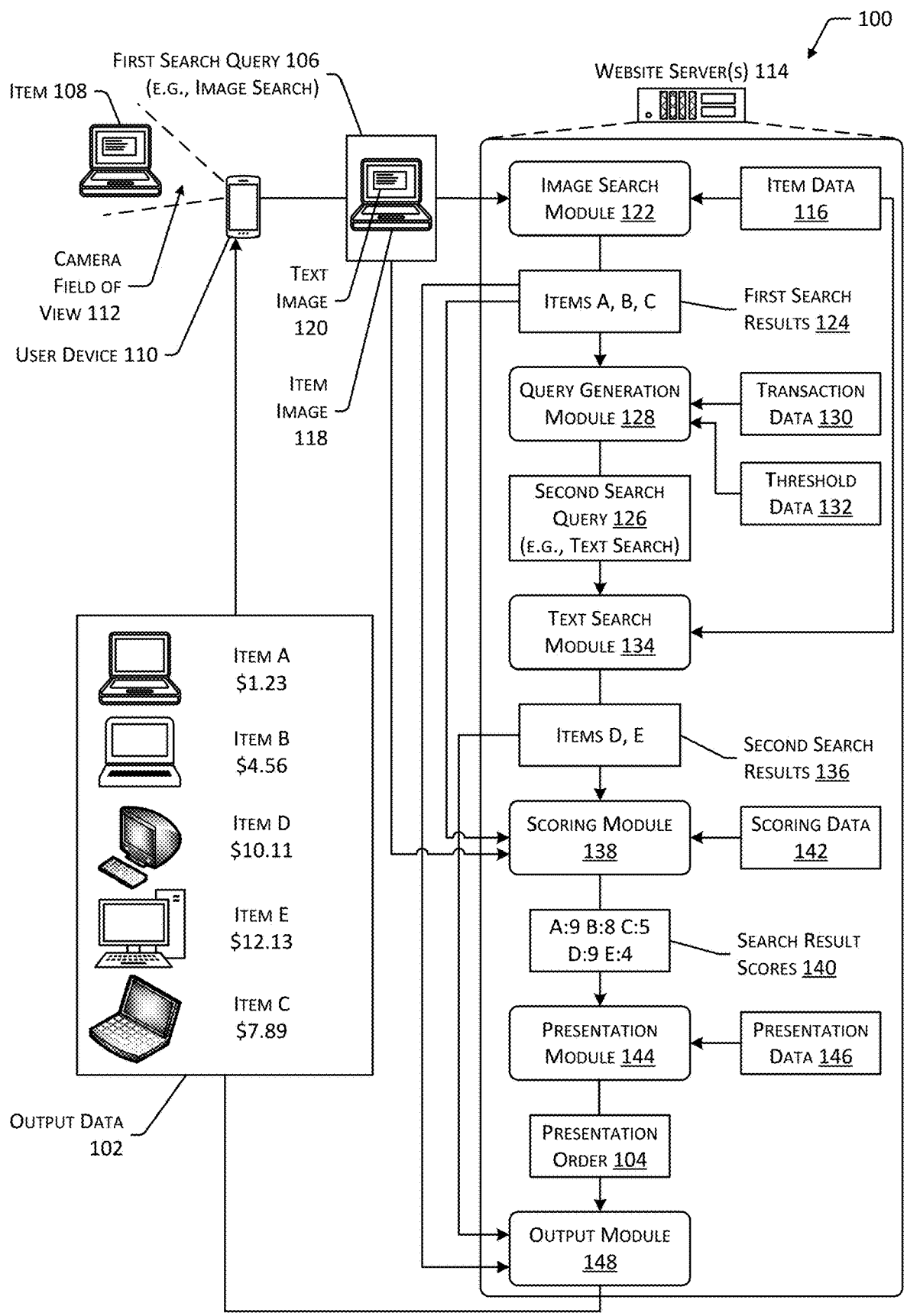
FIG. 1 is a diagram depicting an implementation of a system for determining output data that presents items from both an image-based search query and a text-based search query using a determined presentation order.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to coverall modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Certain websites, applications, services, and so forth may be used to perform an image-based search, in which images that are identical or similar to an input image provided by a user may be determined and output as a search result. For example, a user may acquire an image of an item and provide data indicative of the image to an online store as a search query to search for items that are identical or similar to the item represented in the image. In some cases, the number of search results determined using an image-based search process is small. Additionally, in some cases, at least a portion of the search results determined using an image-based search are not relevant to the initial search query. To increase the number and relevance of the search results that are determined in response to an image-based search query, some systems determine a text query based on a received image and also determine search results that correspond to the text query. However, the manner in which heterogenous search results associated with both image and text search queries are presented may not effectively prioritize relevant search results.

Described in this disclosure are techniques for determining a search output that presents search results in a manner that increases the presentation of relevant items in a prioritized order or position relative to other items. A first search query that includes an image of an item is received. A first set of search results is determined based on correspondence between the image of the item and images of other items, in which each search result is associated with an item having an image that is within a threshold similarity of the image included in the first search query. Each search result in the first set may be scored based on this correspondence. If at least a threshold number of search results have a score that exceeds a threshold score, this may indicate that the search results are likely to be relevant, and the image-based search results may be presented without using additional searching techniques. In some implementations, a score associated with a search result may further be determined based on characteristics of an item represented by the search result. For example, items associated with at least a threshold number of purchases, or other types of user interactions may be associated with a greater score than other items.

However, if the first set of search results does not include a threshold number of search results having a score that exceeds the threshold score, a second search query may be generated. The second search query includes text based on the image of the first search query. In some implementations, the second search query may be determined based on behavior signals associated with an online store. For example, if the particular item or type of item depicted in the image of the first search query is able to be identified, previous queries that are associated with purchases of the particular item or type of item, may be used to generate the second search query. In cases where this data is not available, cannot be acquired, or is not usable to generate a search query, text indicative of visual characteristics in the image may be used to generate the second search query. In some cases, this text may be determined using computer vision algorithms to identify objects or other characteristics in the image. In other cases, if the item or type of item depicted in the image is able to be identified, text associated with the identified item, such as a product text description for an online store, may be used to generate the second search query. In other implementations, if the image of the first search query includes text, optical character recognition (OCR) or another type of text-recognition algorithm may be used to determine the second search query based on this text. In some implementations, multiple text queries or parameters for text queries may be determined using more than one of these methods, and the second search query may be determined by using parameters from at least two of these methods.

A second set of search results may be determined using the second search query, each second search result being associated with an item that corresponds to the text of the second search query. Each search result in the second set may be scored based on correspondence between the item associated with the search result and the text of the second query, or in some implementations based on correspondence between the item associated with the search result and the item depicted in the first search query. The first set of search results and their corresponding scores, and the second set of search results and their corresponding scores, may then be used to determine a presentation order for an output that presents at least a portion of the search results. In some implementations, scores for the second search results may be based at least in part on user interactions associated with the items represented by the search results, such as a number of purchases associated with an item. Additionally, in some implementations, the presentation order may be determined by creating a single ranking of the search results in the first set and second set based on the scores determined for each set.

In one implementation, the portion of the first set of search results having a score greater than the threshold score may be presented prior to other search results. These search results may be followed by a selected number of search results from the second set, such as the ten second search results having the highest scores. The search results from the second set may then be followed by the remainder of the first set of search results, which includes search results associated with an image similar to the image of the first search query, that are not associated with a score greater than the threshold score. In some cases, the threshold score may be selected based on the method used to generate the second search query. For example, if text based on previous queries that are associated with purchases of items is used to generate the second search query, this method is generally likely to return search results that are relevant. In such a case, a higher threshold score may be used when determining the search results from the first set to be presented prior to the search results from the second set. In cases where optical character recognition (OCR) is used on text depicted in the image to determine the second search query, a lower threshold score may be used to cause a larger number of search results from the first set to be presented prior to the search results from the second set. In other implementations, other presentation orders may be used, such as alternating presentation of a single search result from the first set followed by a single search result from the second set, and interleaving the search results in this manner.

In cases where the first set of search results and the second set of search results contain one or more duplicate results, the duplicate results may be removed from one of the sets. In some implementations, search results that are included in both sets may be prioritized and presented prior to other search results, such as by increasing a score associated with a search result that is included in both the first set and the second set.

Implementations described herein may increase the likelihood that relevant search results will be located and presented in an order that is likely to include search results of greater relevance prior to other search results. The implementations described herein may improve user engagement. Implementations described herein may also improve computational efficiency and reduce use of computational resources. For example, inclusion of a selected number of search results using the presentation order described herein may reduce the number of computational operations performed to generate the search results, and may reduce the amount of navigational steps associated with user selection of search results through use of the presentation order described herein.

FIG. 1 is a diagram 100 depicting an implementation of a system for determining output data 102 that presents items from both an image-based search query and a text-based search query using a determined presentation order 104. To generate a first search query 106 based on an image of an item 108, a user device 110 may be used to acquire the image of the item 108, such as by positioning the item 108 within a camera field of view 112 and using a camera of the user device 110 to acquire the image. For example, FIG. 1 depicts the item 108 as a computing device, such as a laptop computer, however the item 108 may include any type of item. FIG. 1 depicts the user device 110 as a smartphone, however in other implementations, the user device 110 may include any number and any type of computing device(s) including, without limitation, one or more personal computing devices, portable computing devices, wearable computing devices, servers, vehicle-based computing devices, networked media devices (e.g., set top boxes, smart televisions, networked speakers, gaming controllers), and so forth. While FIG. 1 depicts the user device 110 as a smartphone that includes an integrated camera, in other implementations, a separate camera may be used to acquire the image of the item 108, and data indicative of the image may be provided to the user device 110. Additionally, while FIG. 1 depicts the item 108 as a single item, in some implementations, the item 108 may include a group or set of items.

The user device 110 may generate the first search query 106 based on the acquired image and provide the first search query 106 to one or more website servers 114. For example, the website server(s) 114 may be associated with an online store or other type of entity that stores item data 116 indicative of items available for purchase, lease, subscription, or other types of transactions or computational tasks. While FIG. 1 depicts the website server(s) 114 as a server, the website server(s) 114 may include any number and any type of computing device(s) including, without limitation, the types of computing devices described with regard to the user device 110. Additionally, while FIG. 1 depicts the user device 110 generating the first search query 106 based on the image of the item 108, in other implementations, the user device 110 may provide the image or other data indicative of the image to the website server(s) 114, and the website server(s) 114 may generate the first search query 106 based on the received data.

The first search query 106 may include image data indicative of the image of the item 108 from which the first search query 106 was generated. For example, the first search query 106 may include an item image 118 that represents the image of the item 108 as acquired by one or more cameras. In some implementations, an item 108 may include text that is represented in the acquired image. For example, an item 108 may include text on an exterior thereof, such as text on a book cover, container, product packaging, article of clothing, and so forth. Continuing the example, FIG. 1 depicts the depicted item 108 as a laptop computer having text presented on a display. As such, the first search query 106 may include a text image 120 that represents the text in addition to the item image 118 that represents the item 108. While FIG. 1 indicates the item image 118 and text image 120 as separate conceptual components of the first search query 106 for illustrative purposes, the first search query 106 may include a single image that includes both the depicted item 108 and depicted text in the single image.

An image search module 122 associated with the website server(s) 114 may determine first search results 124 based on the first search query 106. Specifically, the image search module 122 may determine correspondence between the first search query 106 and item data 116 that includes data indicative of one or more items. For example, the image search module 122 may use one or more computer vision algorithms, object recognition algorithms, edge detection algorithms, color recognition algorithms, pattern recognition algorithms, and so forth, to identify the depicted item 108, characteristics of the item 108 or of the image, and so forth. The item data 116 may include images of other items, data indicative of characteristics of the images, and so forth. By determining correspondence between the first search query 106 and the item data 116, the image search module 122 may determine first search results 124 that represent items associated with images that are identical or similar to the image of the first search query 106, such as images within a threshold similarity of the first search query 106.

As described previously, in addition to performing a first search query 106 based on an image of an item 108, a second search query 126 based on text that is associated with one or more of the item 108 or the first search query 106 may also be used to determine additional search results. A query generation module 128 associated with the webpage server(s) 114 may determine text associated with the item 108 or first search query 106, and may generate the second search query 126 based on the text. In some cases, the query generation module 128 may determine the text for the second search query 126 based on the item 108, such as by using computer vision or other types of algorithms to identify the item 108 or other items that are similar to the item 108, then accessing the item data 116 to determine text associated with the item(s) 108, such as a product description. The query generation module 128 may also determine text based on the first search query 106, such as by determining features of the image of the depicted item 108, then determining text based on the features of the image, such as a description of objects or other visual characteristics of the image. In some cases, text based on the item 108 or other similar items may be determined based in part on the first search results 124. In some implementations, if the image included in the first search query 106 includes text, as shown in the text image 120 in FIG. 1, the query generation module 128 may use OCR or other text-recognition techniques to determine text for the second search query 126 based on the text image 120. In some implementations, if the item 108, similar items, a category of the item 108, or other characteristics of the item 108 are identified, the query generation module 128 may access transaction data 130, such as purchase history data or other types of user interaction data, which may indicate previous queries that were received and ultimately led to a purchase or other type of user interaction associated with an item 108.

In some implementations, if a count of first search results 124 that are determined is greater than a threshold count, as indicated in threshold data 132, or if a count of first search results 124 associated with a score greater than a threshold score exceeds a threshold count, generation of a second search query 126 may be omitted. In other cases, the techniques used to generate the second search query 126 may be selected based in part on the count of first search results 124 or scores associated with the first search results 124.

A text search module 134 associated with the website server(s) 114 may determine second search results 136 based on the second search query 126 and the item data 116. For example, the text search module 134 may determine correspondence between the text of the second search query 126 and the item data 116, which may include text associated with various items, such as item names, product descriptions, categories, and features, reviews of items, prices of items, and so forth. In some cases, one or more of the second search results 136 may match one or more of the first search results 124. For example, an image of an item that is identical or similar to the image of the first search query 106 may also be associated with text that is descriptive of the item 108 depicted in the image of the first search query 106, or text determined from transaction data 130 to have been associated with purchases of the depicted item. In such a case, duplicate results may be removed from one of the first search results 124 or the second search results 136. In other cases, the second search results 136 may include one or more search results that are not included in the first search results 124. Similarly, the first search results 124 may include one or more search results that are not included in the second search results 136.

A scoring module 138 associated with the website server(s) 114 may determine search result scores 140 for at least a subset of the first search results 124 and the second search results 136. A search result score 140 may represent a level of similarity or degree of correspondence between a particular search result, or the item represented by the search result, and one or more of the first search query 106 or second search query 126. For example, first search results 124 that include an image that is identical or extremely similar to the image included in the first search query 106 may be associated with a high score, while first search results 124 that include an image that is less similar to the image included in the first search query 106 may include a lower score. Second search results 136 may be scored based on correspondence between the text associated with each second search result 136 and the text of the second search query 126, the images of the item represented by each second search result 136 and the image 108 of the first search query 106, or a combination of these factors. In some implementations, the scoring module 138 may access scoring data 142, which may include one or more rules, algorithms, techniques, threshold values, and so forth for determining a search result score 140 based on a search result and a search query.

A presentation module 144 associated with the website server(s) 114 may determine the presentation order 104 associated with at least a subset of the first search results 124 and second search results 136 based at least in part on the search results scores 140 and on presentation data 146, which may include rules, algorithms, threshold values, and so forth that are used to determine the presentation order 104. For example, the presentation data 146 may indicate a rule that for a first category of items, the presentation order 104 is to cause presentation of the second search result 136 having the highest score, followed by the first search result 124 having the highest score, then the second search result 136 having the second highest score, the first search result 124 having the second highest score, and so forth, presenting second search results 136 and first search results 124 in an alternating manner in descending order of search result scores 140, until a threshold number of results are presented. As another example, the presentation data 146 may indicate a rule that for a second category of items, the presentation order 104 is to cause presentation of a first portion of the first search results 124 having a score greater than a threshold score, a selected number of the second search results 136 having the highest search result scores 140 of the second search results 136, and a second portion of the first search results 124 having a score less than the threshold score, until each search result is presented or until a threshold number of search results is presented. In other implementations, the presentation data 146 may indicate rules or algorithms for determining a single ranking of search results based on the first search results 124, the second search results 136, and the search result scores 140.

An output module 148 associated with the website server(s) 114 may determine output data 102 based on the search results and presentation order 104. In the example shown in FIG. 1, the first search results 124 include three items ("A", "B", and "C"). The second search results 136 include two items ("D" and "E"). The search result scores 140 for items "A", "B", and "C" are 9, 8, and 5, respectively. For example, items "A" and "B" may be associated with a search result score 140 greater than a threshold score, while item "C" is not associated with a search result score 140 greater than the threshold score. The search result scores for items "D" and "E" are 9 and 4, respectively. Therefore, item "D" may be associated with a search result score 140 that is greater than the search results score 140 for item "E". The output data 102 causes presentation of items "A" and "B" before other search results because each of item "A" and "B" are associated with a search result score 140 greater than the threshold score. Item "A" is presented before item "B" due to the search result score 140 for item "A" being greater than the search result score 140 for item "B". Items "D" and "E" are presented after the portion of the first search results 124 having a score greater than the threshold score as a selected number of search results (e.g., two search results) determined based on the second search query 126. The search result scores 140 for items "D" and "E" are 9 and 4, respectively. Additional search results determined using the second search query 126 (e.g., search results having a search result score 140 less than that of item "E") may not be included in the output data 102, or may be included after all of the depicted search results. Item "D" is presented before item "E" due to item "D" being associated with a search result score 140 greater than that of item "E". Item "C" is presented after item "E" due to item "E" being included in a second portion of the first search results 124 having a score less than the threshold score. While FIG. 1 depicts only three first search results 124, additional first search results 124 having a score less than the threshold score may similarly be presented after item "C", ordered based on descending search result scores 140. In other implementations, outputs may be determined using other rules or algorithms for determining an order of presentation for search results. For example, an output may present first search results 124 and second search results 136 in an alternating (e.g., interleaving) manner, in descending order of search result scores 140.

Figure 2A:
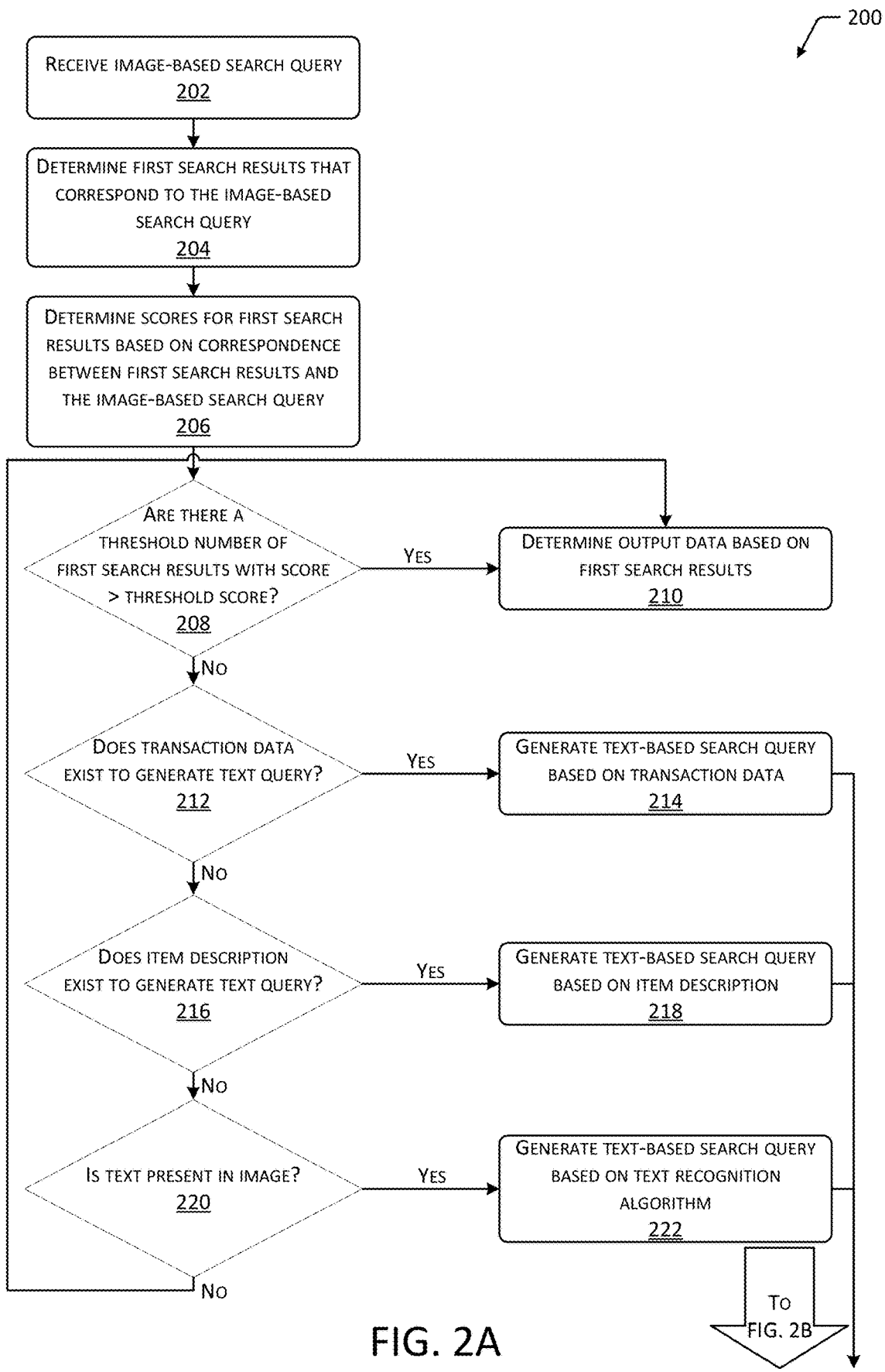
FIGS. 2A and 2B are a flow diagram depicting an implementation of a method for determining output data based on an image-based search query and a text-based search query.
Figure 2B:
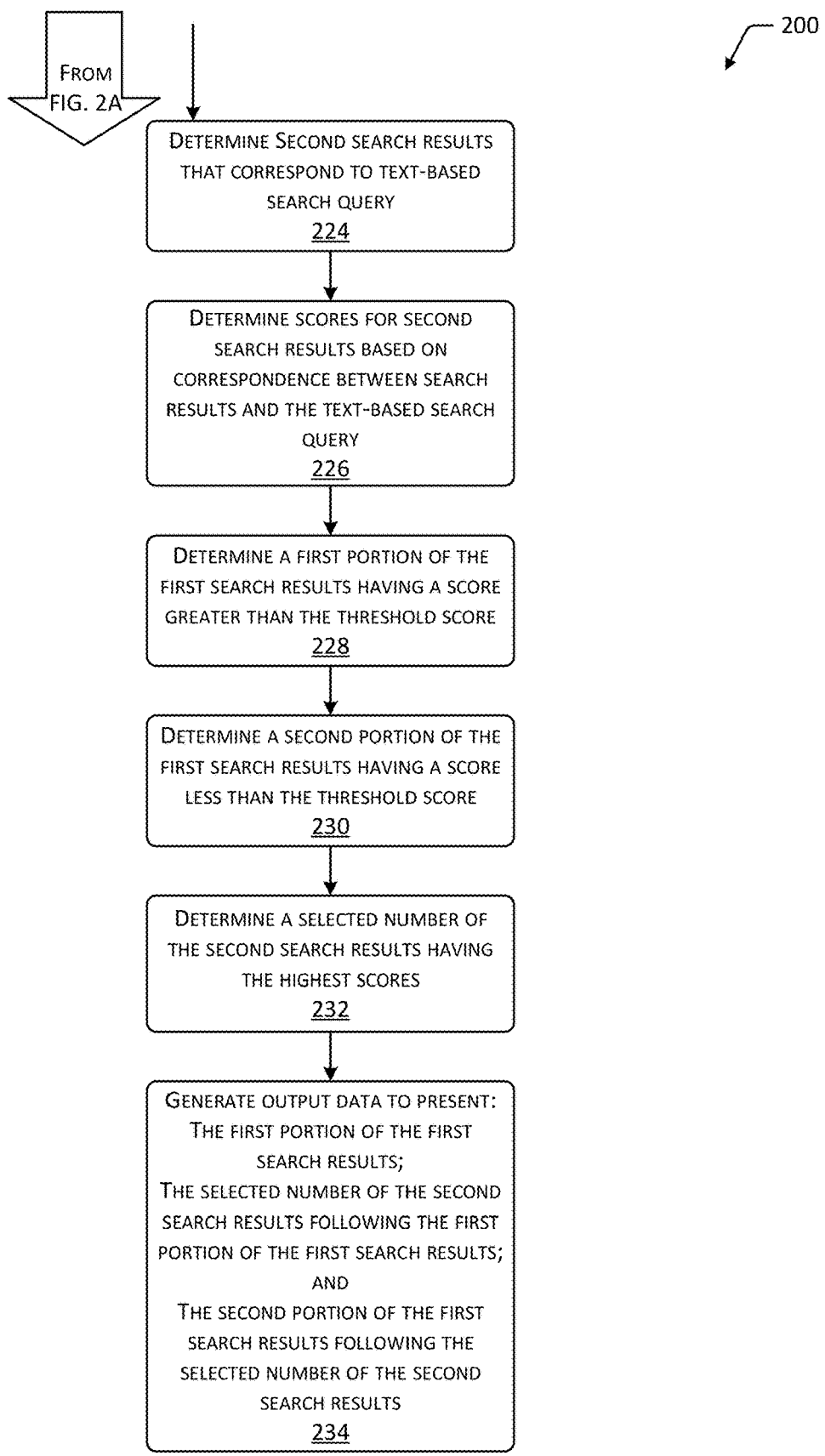

FIGS. 2A and 2B are a flow diagram 200 depicting an implementation of a method for determining output data 102 based on an image-based search query and a text-based search query. At 202, an image-based search query may be received. For example, as described with regard to FIG. 1, a user device 110 may generate a first search query 106 based on an image that depicts an item 108, or may provide data indicative of the image to one or more website servers 114, which may determine the first search query 106 based on the image. The image included in the first search query 106 may depict one or more items, and in some cases may include an image of text, such as text that is included on an item, product packaging, a display on which the item is presented, and so forth.

At 204, first search results 124 may be determined that correspond to the image-based search query. For example, correspondence between the image included in the first search query 106 and item data 116, which may include images of one or more items, may be used to determine items associated with images that are identical or similar to the image of the first search query 106. For example, an image search module 122 may use one or more computer vision algorithms, object recognition algorithms, edge detection algorithms, and so forth, to identify the depicted item 108, characteristics of the item 108 or of the image, and so forth, for comparison with item data 116.

At 206, scores for the first search results 124 may be determined based on correspondence between the first search results 124 and the image-based search query. For example, a scoring module 138 may determine search result scores 140 for at least a subset of the first search results 124 based on a level of similarity or degree of correspondence between the image of an item represented by a particular search result and the image in the first search query 106. First search results 124 that include an image that is identical or extremely similar to the image included in the first search query 106 may be associated with a high score, while first search results 124 that include an image that is less similar to the image included in the first search query 106 may include a lower score. Similarly, first search results 124 that include images of items that are less similar to the image of the first search query 106 may be associated with lower scores. In other implementations, a lower score, a target value, or a qualitative value such as "high relevance" may be used to indicate identical or similar images, and a higher score, a different target value, or a qualitative value such as "low relevance" may be used to indicate less similar images.

At 208, a determination may be made whether a threshold number of first search results 124 associated with a score greater than a threshold score has been determined. For example, threshold data 132 may specify a threshold count of search results, such as ten. In such a case, if the portion of the first search results 124 having a search result score 140 greater than the threshold score includes at least ten search results, the method may proceed to 210.

At 210, in response to determining at least a threshold count of first search results 124 having a score greater than the threshold score, output data 102 may be determined based on the first search results 124. For example, the output data 102 may cause presentation of each of the first search results 124, ordered from the greatest score to the lowest score. In other implementations, the output data 102 may cause presentation of a selected number of the first search results 124, such as the ten first search results 124 associated with the greatest search result scores 140, ordered from the greatest score to the lowest score.

If the number of first search results 124 associated with a score greater than a threshold score is less than the threshold number at 208, the method may proceed to 212. At 212, a determination may be made whether transaction data 130 exists for generation of a text-based query. For example, each first search result 124 may represent a particular item or group of items. For a particular item, transaction data 130 may exist that represents previous queries that resulted in purchases of the item, or resulted in previous user interactions associated with the item or data that represents the item. In some cases, transaction data 130 for an item may be used to determine text, such as text from previous queries that ultimately resulted in the purchase of the item, which may be used to generate a second search query 126. A second search query 126 based on text that ultimately resulted in a purchase or user interaction with an item has a substantial likelihood to cause relevant search results to be determined.

In cases where sufficient transaction data 130 exists to generate a text-based query, the method may proceed to 214. At 214, a text-based search query may be generated based on the transaction data 130. For example, a query generation module 128 may determine text from previous queries that resulted in a purchase or user interaction with an item and may include at least a subset of the determined text in a second search query 126.

In cases where transaction data 130 is not present or is not usable to generate a text-based query, the method may proceed to 216. At 216, a determination may be made whether item description text exists for generation of a text-based query. For example, the image included in the first search query 106 and each first search result 124 may represent a particular item or group of items. In some cases, at least a subset of the items may be associated with text, such as a product description, name, user reviews, characteristics of the items, and so forth. For example, a website server 114 associated with an online store may maintain a catalog of items available for purchase, lease, subscription, and so forth, stored as item data 116, and the item data 116 may include, for at least a subset of the items, text that is descriptive of the items.

In cases where sufficient item descriptions (e.g., item data 116) exists to generate a text-based query, the method may proceed to 218. At 218, a text-based search query may be generated based on item data 116 that corresponds to the first search results 124 and first search query 106. For example, a query generation module 128 may determine text that is present in the item data 116 that is associated with the items represented by the first search results 124 or first search query 106 and may include at least a portion of this text in a second search query 126.

In cases where item descriptions are not present or are not usable to generate a text-based query, the method may proceed to 220. At 220, a determination may be made whether text is present in the image of the first search query 106. For example, an image of an item 108 may include text, such as a label or other text presented on the item itself, text presented on product packaging, text presented on a screen or other type of display on which the item is presented, and so forth. In some cases, this text may be relevant for use in a search query, such as by describing one or more characteristics of the depicted item.

If text is present in the image of the first search query 106, the method may proceed to 222. At 222, a text-based search query may be generated using a text recognition algorithm, such as OCR. At least a portion of the text that is present in the image may be used in a second search query 126.

If transaction data 130, item description information, and text within the image of the first search query 106 are each absent, or are not able to be used to generate a text-based query, the method may proceed to 210, and the first search results 124 may be used to determine the output data 102 without use of a second search query 126.

In the implementation shown in FIG. 2A, a hierarchy of sources for text to generate a second search query 126 is used. For example, if transaction data 130 is present, a second search query 126 is generated based on the transaction data 130 due to the substantial likelihood of determining relevant search results based on previous queries that resulted in purchases and user interactions. If transaction data 130 is absent or not usable, item description information may be used, and if item description information is absent or not usable, text that is present in the image of the first search query 106 may be used. However, in other implementations, multiple text-based search queries may be generated using any combination of the techniques described at 214, 218, and 222, and search results may be obtained using more than one second search query 126. In some implementations, multiple text-based search queries may be determined, and a single second search query 126 may be determined using parameters from a combination of the multiple text-based search queries. Additionally, while FIG. 2A illustrates a hierarchy of sources for text to generate the second search query 126, in other implementations, the order in which the steps described at blocks 212, 216, and 220 may be changed. For example, the step described at 220 may be performed before both steps described at 212 and 216. As another example, the step described at 220 may be performed after the step described at 212 and before the step described at 216.

As shown in FIG. 2B, after determining a second search query 126, at 224, second search results 136 that correspond to the text-based query may be determined. For example, a text search module 134 may determine second search results 136 based on correspondence between the second search query 126 and item data 116 that associates text, such as product descriptions, with various items. In some cases, one or more of the second search results 136 may match one or more of the first search results 124. In such a case, duplicate results may be removed from one of the first search results 124 or the second search results 136. In some implementations, search results that are included in both the first search results 124 and the second search results 136 may be provided with an increased search result score 140 to cause such search results to be presented prior to other search results. For example, a search result that corresponds to both an image-based query and a text-based query that was determined using the image-based query may be more likely to be relevant to the initial image-based query than other search results.

At 226, scores for the second search results 136 may be determined based on the correspondence between the second search results 136 and the text-based search query. For example, if text that describes an item represented by a second search result 136 closely matches the text-based search query determined based on the first search query 106, this may result in a higher score than second search results 136 associated with text that less-closely corresponds to the text-based search query. In other implementations, a lower score, a target value, or a qualitative value such as "high relevance" may be used to indicate close correspondence, and a higher score, a different target value, or a qualitative value such as "low relevance" may be used to indicate lower correspondence.

At 228, a first portion of the first search results 124 having a score greater than the threshold score may be determined. For example, the first search results 124 may include multiple search results. In some cases, one or more of the first search results 124 may represent an item associated with an image that closely corresponds to the image of the first search query 106. In such a case, scores for these first search results 124 may be associated with a search result score 140 that is greater than a threshold score.

At 230, a second portion of the first search results 124 having a score less than the threshold score may be determined. For example, in cases where a first search result 124 represents an item associated with an image that does not closely correspond to the image of the first search query 106, the score for that result may be less than the threshold score. In some implementations, a separate determination of the second portion of the first search results 124 may be omitted, and any first search result 124 that is not included in the first portion determined at 228 may be included in the second portion.

At 232, a selected number of second search results 136 having the highest scores among the second search results 136 may be determined. For example, threshold data 132 or user input data, such as a configuration, setting, preference, or user-input value, may be used to determine a selected number of second search results 136. Continuing the example, a selected number of second search results 136 may include ten search results. Based on the selected number, the ten second search results 136, or another selected number, having the highest search result scores 140, may be determined.

At 234, output data 102 may be generated to present the first portion of the first search results 124, followed by the selected number of second search results 136, followed by the second portion of the first search results 124. For example, a presented output may include all determined items associated with images that closely correspond to the image included in the first search query 106, followed by a selected number of items associated with text that closely corresponds to the second search query 126, followed by the remainder of the first search results 124. In other implementations, other presentation orders 104 may be determined based on item categories or other characteristics of the item associated with the first search query 106. For example, different presentation orders 104, such as presenting individual first search results 124 and second search results 136 in an alternating (e.g., interleaving) manner, may be used for items having different categories or other characteristics.

Figure 3:
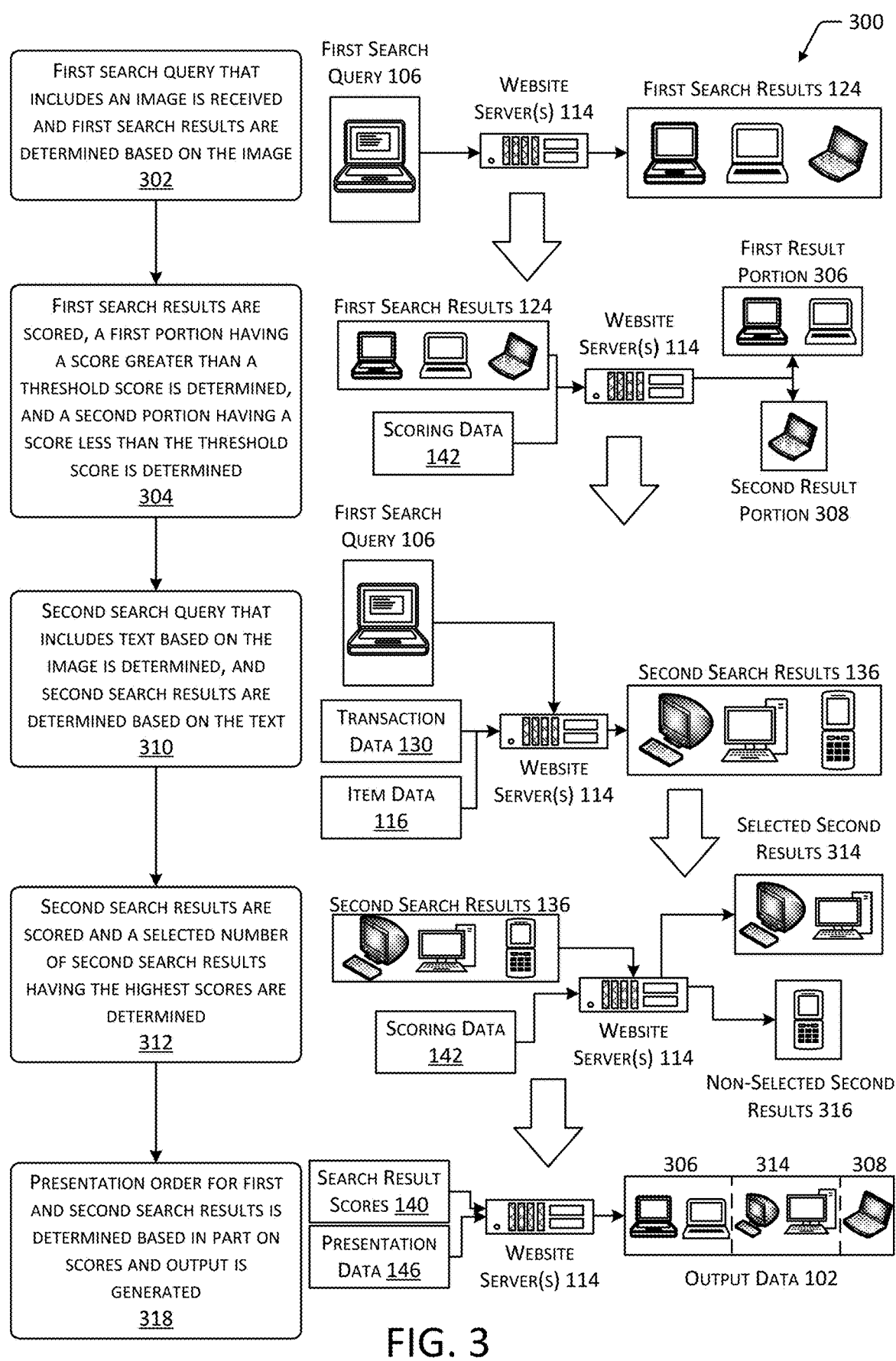
FIG. 3 is a diagram depicting a process for determining a presentation order for search results based on scores associated with the search results.

FIG. 3 is a diagram 300 depicting a process for determining a presentation order 104 for search results based on scores associated with the search results. At 302, a first search query 106 that includes an image is received, and first search results 124 are determined based on the image. For example, as described with regard to FIGS. 1 and 2A, correspondence between an image associated with a first search query 106 and item data 116 that associates images with items may be determined. The first search results 124 may represent items associated with an image that is identical or similar to the image of the first search query 106. In the example shown in FIG. 3, the first search results 124 include three items, however any number of first search results 124 may be determined. In some implementations, the number of first search results 124 may include every item of the item data 116 that is associated with an image that is similar to the first search query 106. In other implementations, the number of first search results 124 may include a selected number.

At 304, the first search results 124 are scored, a first result portion 306 having a score greater than a threshold score is determined, and a second result portion 308 having a score less than the threshold score is determined. The score associated with each first search result 124 may represent the degree of similarity between the image associated with the first search result 124 and the image of the first search query 106. The scores for the first search results 124 may be determined based in part on scoring data 142, which may include one or more rules, algorithms, techniques, threshold values, and so forth for determining a search result score 140 based on a search result and a search query. In the example shown in FIG. 3, the first result portion 306 representing items having scores greater than the threshold score includes two items, while the second result portion 308 representing items having scores less than the threshold score includes one item. In some implementations, the threshold score may be determined based on one or more characteristics of the item, or in some cases, based on one or more characteristics of a second search query 126. For example, if the second search query 126 is determined based on transaction data 130, a higher threshold score may be used than if the second search query 126 is determined based on text included in the image of the first search query 106.

At 310, a second search query 126 that includes text based on the image of the first search query 106 is determined, and second search results 136 are determined based on the text of the second search query 126. As described with regard to FIGS. 1 and 2A, a second search query 126 may be determined based on one or more of transaction data 130 indicative of previous queries that resulted in a purchase or other user interaction associated with an item, item data 116 that includes text associated with characteristics of the item presented in the image of the first search query 106 or with similar items, or text that is included in the image of the item in the first search query 106. Correspondence between the text of the second search query 126 and item data 116, which may associate text with items, may be used to determine second search results 136, each second search result 136 representing an item associated with text that is within a threshold similarity of the text of the second search query 126. In the example shown in FIG. 3, the second search results 136 include three search results, however, any number of second search results 136 may be determined.

At 312, the second search results 136 are scored, and a selected number of second search results 136 having the highest scores are determined. Characteristics of the second search results 136 and scoring data 142 may be used to determine scores for the second search results 136 based on one or more of correspondence between the text of the second search results 136 and the text of the second search query 126, the images associated with the items represented by the second search results 136 and the image of the first search query 106, or combinations thereof. In the example shown in FIG. 3, the number of selected second results 314 includes two search results. As a result, two of the items included in the second search results 136 are selected second results 314, while one of the items included in the second search results 136 is a non-selected second result 316. The selected number of second search results 136 may be selected based on the scores for the second search results 136, from greatest to least, such that the selected number of second search results 136 includes the second search results 136 with the highest scores.

At 318, a presentation order 104 for the search results is determined based in part on the scores for the search results, and an output is generated. For example, a presentation order 104 may be determined based on one or more characteristics of the item 108 indicated in the first search query 106, such as a category of the item 108. Presentation data 146 may specify one or more rules to cause a particular presentation order 104 to be determined based on the search results scores 140 and in some cases based on characteristics of the item 108. In one implementation, the presentation order 104 may include presentation of the first result portion 306 of the first search results 124 (e.g., representing items having high scores due to similarity between the images of those items and the image in the first search query 106), followed by presentation of the selected second results 314 (e.g., representing items associated with text that highly corresponds to the text of the second search query 126 or associated with images that highly correspond to the image of the first search query 106), which are followed by the second result portion 308 of the first search results 124 (e.g., representing items that are potentially relevant but have lower scores due to a lower degree of similarity between images of the item and the image in the first search query 106). In the example shown in FIG. 3, the non-selected second results 316 may be disregarded. In other implementations, one or more the non-selected second results 316 may be included in output data 102 after the second result portion 308 of the first search results 124.

In other implementations, other presentation orders 104 may be used. For example, second search results 136 and first search results 124 may be presented in an alternating manner, in descending order based on the scores for the search results.

Figure 4:
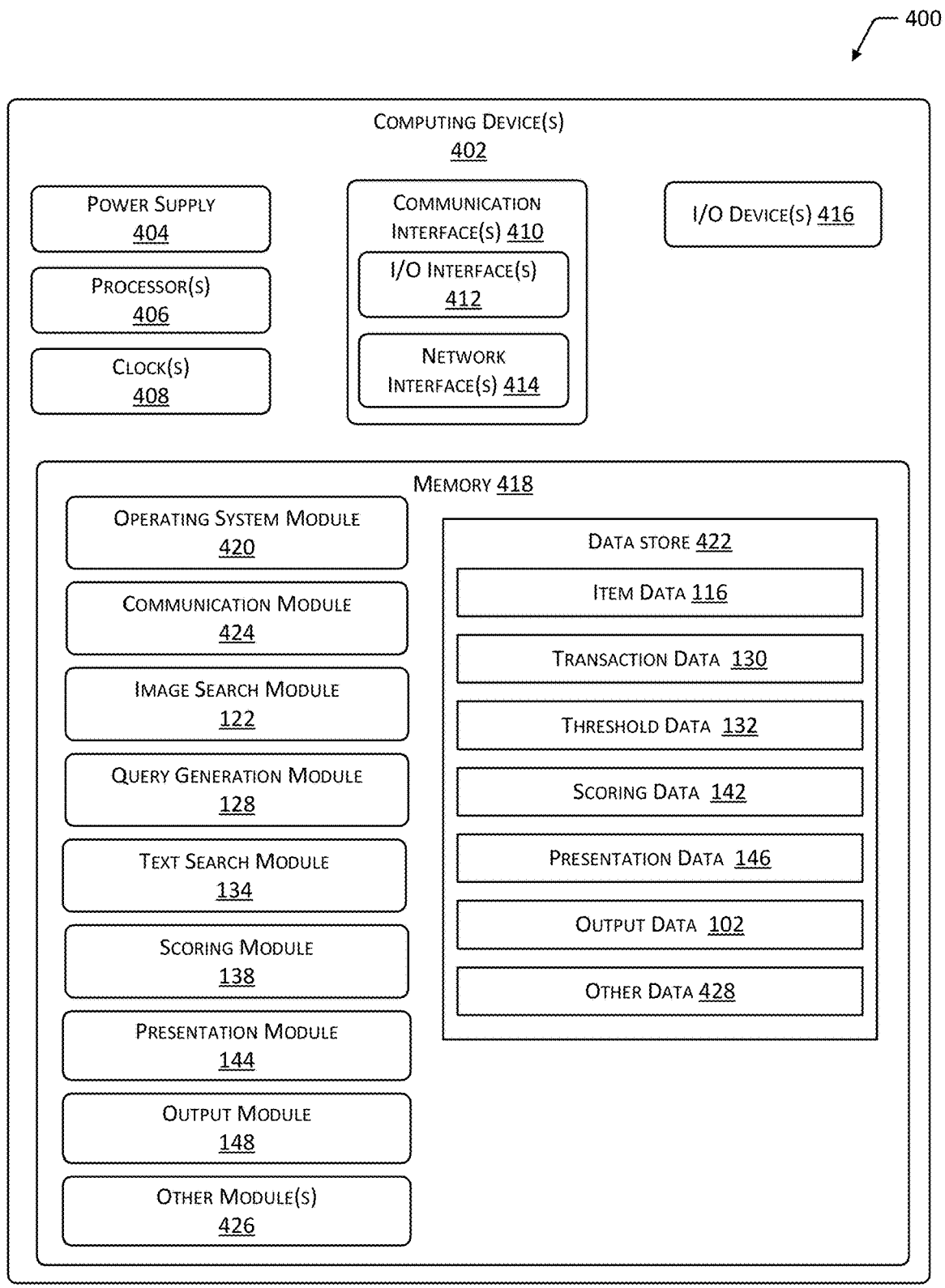
FIG. 4 is a block diagram depicting an implementation of a computing device within the present disclosure.

FIG. 4 is a block diagram 400 depicting an implementation of a computing device 402 within the present disclosure. The computing device 402 may include one or more website servers 114 as described with regard to FIG. 1. However, in some implementations, one or more user devices 110 or other computing devices may perform at least a portion of the functions described herein. As such, while FIG. 4 depicts a single block diagram 400, the depicted computing device 402 may include any number of computing devices of similar or different types.

One or more power supplies 404 may be configured to provide electrical power suitable for operating the components of the computing device 402. In some implementations, the power supply 404 may include a rechargeable battery, fuel cell, photovoltaic cell, power conditioning circuitry, and so forth.

The computing device 402 may include one or more hardware processor(s) 406 (processors) configured to execute one or more stored instructions. The processor(s) 406 may include one or more cores. One or more clock(s) 408 may provide information indicative of date, time, ticks, and so forth. For example, the processor(s) 406 may use data from the clock 408 to generate a timestamp, trigger a preprogrammed action, and so forth.

The computing device 402 may include one or more communication interfaces 410, such as input/output (I/O) interfaces 412, network interfaces 414, and so forth. The communication interfaces 410 may enable the computing device 402, or components of the computing device 402, to communicate with other computing devices 402 or components of the other computing devices 402. The I/O interfaces 412 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 412 may couple to one or more I/O devices 416. The I/O devices 416 may include any manner of input devices or output devices associated with the computing device 402. For example, I/O devices 416 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 416 may be physically incorporated with the computing device 402. In other implementations, I/O devices 416 may be externally placed.

The network interfaces 414 may be configured to provide communications between the computing device 402 and other devices, such as the I/O devices 416, routers, access points, and so forth. The network interfaces 414 may include devices configured to couple to one or more networks including local area networks (LANs), wireless LANs (WLANs), wide area networks (WANs), wireless WANs, and so forth. For example, the network interfaces 414 may include devices compatible with Ethernet, Wi-Fi, Bluetooth, ZigBee, Z-Wave, 3G, 4G, 5G, LTE, and so forth.

The computing device 402 may include one or more buses or other internal communications hardware or software that allows for the transfer of data between the various modules and components of the computing device 402.

As shown in FIG. 4, the computing device 402 may include one or more memories 418. The memory 418 may include one or more computer-readable storage media (CRSM). The CRSM may be any one or more of an electronic storage medium, a magnetic storage medium, an optical storage medium, a quantum storage medium, a mechanical computer storage medium, and so forth. The memory 418 may provide storage of computer-readable instructions, data structures, program modules, and other data for the operation of the computing device 402. A few example modules are shown stored in the memory 418, although the same functionality may alternatively be implemented in hardware, firmware, or as a system on a chip (SoC).

The memory 418 may include one or more operating system (OS) modules 420. The OS module 420 may be configured to manage hardware resource devices such as the I/O interfaces 412, the network interfaces 414, the I/O devices 416, and to provide various services to applications or modules executing on the processors 406. The OS module 420 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 422 and one or more of the following modules may also be associated with the memory 418. The modules may be executed as foreground applications, background tasks, daemons, and so forth. The data store(s) 422 may use a flat file, database, linked list, tree, executable code, script, or other data structure to store information. In some implementations, the data store(s) 422 or a portion of the data store(s) 422 may be distributed across one or more other devices including other computing devices, network attached storage devices, and so forth.

A communication module 424 may be configured to establish communications with one or more other computing devices 402. Communications may be authenticated, encrypted, and so forth.

The memory 418 may also store the image search module 122. The image search module 122 may determine search results based on a search query that includes an image, such as by determining correspondence between an image in a search query and item data 116 that includes one or more images of items. For example, the image search module 122 may use one or more computer vision algorithms, object recognition algorithms, edge detection algorithms, color recognition algorithms, pattern recognition algorithms, and so forth, to identify a depicted item 108, characteristics of the item 108 or of the image, and so forth.

The memory 418 may additionally store the query generation module 128. The query generation module 128 may generate a text-based search query based in part on an image-based search query. In some implementations, the query generation module 128 may determine text for a search query based on the item 108 depicted in the image-based search query, such as by using computer vision or other types of algorithms to identify the item 108 or other items that are similar to the item 108, then accessing the item data 116 to determine text associated with the item(s) 108, such as a product description. In other implementations, the query generation module 128 may determine text based on features of the image of the depicted item 108, such as a description of objects or other visual characteristics of the image. In some cases, text based on the item 108 or other similar items may be determined based in part on the first search results 124. In other implementations, if the image included in the image-based search query includes text, the query generation module 128 may use OCR or other text-recognition techniques to identify the text, which may be used in a text-based search query. In some implementations, a text-based search query may be generated based on transaction data 130, which may indicate previous queries that were received and ultimately led to a purchase or other type of user interaction associated with an item 108. Additionally, in some implementations, multiple text-based search queries may be determined using different techniques, or multiple parameters of a text-based search query may be determined and at least a subset of the parameters may be used to determine a single text-based search query.

The memory 418 may store the text search module 134. The text search module 134 may determine search results based on correspondence between a text-based search query and item data 116, which may associate text (e.g., product descriptions, item names, item characteristics, reviews) with items. In some cases, one or more search results determined using the image search module 122 may match one or more search results determined using the text search module 134. In such a case, duplicate search results may be omitted. In some implementations, duplicate search results may be associated with a larger score or priority for presentation in an output.

The memory 418 may also store the scoring module 138. The scoring module 138 may determine search result scores 140 for at least a subset of the search results determined using the image search module 122 and the text search module 134. The scoring module 138 may access scoring data 142, which may include one or more rules, algorithms, techniques, threshold values, and so forth for determining a search result score 140 based on a search result and a search query. For example, certain scores or types of scores may represent a high degree of correspondence between a search result and a search query, while other scores or types of scores may represent a lesser degree of correspondence between a search result and a search query.

The memory 418 may additionally store the presentation module 144. The presentation module 144 may determine a presentation order 104 associated with at least a subset of determined search results based at least in part on the search results scores 140. The presentation module 144 may also access presentation data 146, which may include rules, algorithms, threshold values, and so forth that are used to determine the presentation order 104 based on characteristics of items, characteristics of search queries, characteristics of search results, and so forth. For example, the presentation data 146 may indicate a rule that for a first category of items, a first set of rules is used to determine the presentation order 104, while for a second item category, a second set of rules may be used to determine the presentation order 104.

The memory 418 may store the output module 148. The output module 148 may determine output data 102 based on search results and a presentation order 104 determined using the presentation module 144. The output data 102 may be used to cause presentation of search results, in the order determined using the presentation module 144, on one or more output devices, such as a display device, speaker, and so forth.

Other modules 426 may also be present in the memory 418. For example, other modules 426 may include permission or authorization modules for sending data to or receiving data from the computing device 402, for modifying configurations or settings, and so forth. Other modules 426 may also include encryption modules to encrypt and decrypt communications between computing devices 402, authentication modules to authenticate communications sent or received by computing devices 402, user interface modules to generate interfaces for presenting output, receiving input from users, and so forth.

Other data 428 within the data store(s) 422 may include configurations, settings, preferences, and default values associated with computing devices 402. Other data 428 may also include encryption keys and schema, access credentials, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more non-transitory memories storing computer-executable instructions; and
one or more hardware processors to execute the computer-executable instructions to:
receive a first search query comprising a first image of a first item;
determine, based at least in part on the first image, a second search query comprising text associated with the first image;
determine a first set of search results based on correspondence between the first image and image data that associates each of a plurality of items with at least one image, wherein the first set includes at least a first search result associated with a second image of a second item and a second search result associated with a third image of a third item;
determine a first score based on correspondence between the first image and the second image;
determine a second score based on correspondence between the first image and the third image;
determine that the first score is greater than or equal to a threshold value;
determine that the second score is less than the threshold value;
determine a second set of search results based on correspondence between the second search query and text data associated with the plurality of items, wherein the text data includes at least a third search result associated with a fourth item; and
determine output data that includes:
data indicative of the second item;
data indicative of the third item; and
data indicative of the fourth item;
wherein the data indicative of the second item is presented prior to the data indicative of the fourth item, and the data indicative of the fourth item is presented prior to the data indicative of the third item.

2. The system of claim 1, wherein the first search query is received at a first time, and the computer-executable instructions to determine the second search query include computer-executable instructions to:
determine one or more third search queries associated with the first item, wherein the one or more third search queries were received before the first time; and
determine the second search query based on at least a subset of a plurality of search terms included in the one or more third search queries.

3. The system of claim 1, wherein the computer-executable instructions to determine the second search query include computer-executable instructions to:
determine one or more search terms based on one or more of:
at least one visual characteristic of the first image of the first item; or
text included in the first image of the first item; and
determine the second search query based on at least a subset of the one or more search terms.

4. A system comprising:
one or more non-transitory memories storing computer-executable instructions; and
one or more hardware processors to execute the computer-executable instructions to:
receive a first search query comprising a first image of a first item;
determine first result data based on the first search query, wherein the first result data comprises one or more first results;
determine, based at least in part on the first image, a second search query comprising text associated with the first image;
determine second result data based on the second search query, wherein the second result data comprises one or more second results;
determine a presentation order based on the first result data and the second result data; and
determine output data based on the presentation order, wherein in response to the presentation order, the output data includes:
a first portion of the first result data presented before a portion of the second result data;
the portion of the second result data presented before a second portion of the first result data; and
the second portion of the first result data presented after the portion of the second result data.

5. The system of claim 4, further comprising computer-executable instructions to:
determine one or more first scores associated with the first portion of the first result data based on correspondence between the first image of the first item and one or more images associated with the first portion;
determine one or more second scores associated with the second portion of the first result data based on correspondence between the first image of the first item and one or more images associated with the second portion; and
determine that the one or more first scores are greater than or equal to a first threshold score and that the one or more second scores are less than the first threshold score;
wherein the first portion of the first result data is presented before the portion of the second result data in response to the one or more first scores being greater than or equal to the first threshold score.

6. The system of claim 5, further comprising computer-executable instructions to:
determine that the second search query is associated with one of:
at least one visual characteristic depicted in the first image of the first item; or
text included in the first image of the first item;
wherein determining the second search query based on the at least one visual characteristic is associated with the first threshold score, and wherein determining the second search query based on the text included in the first image is associated with a second threshold score that is less than the first threshold score; and
select the first threshold score for determining the output data in response to the second search query being associated with the at least one visual characteristic.

7. The system of claim 4, wherein the first search query is received at a first time, and the computer-executable instructions to determine the second search query include computer-executable instructions to:

determine a third search query associated with the first item, wherein the third search query is associated with a second time before the first time; and determine the second search query based on the third search query.

8. The system of claim 4, wherein the first search query is received at a first time, and the computer-executable instructions to determine the second search query include computer-executable instructions to:

determine a failure to determine one or more third search queries associated with the first item and further associated with one or more times before the first time; and determine the second search query based on at least one visual characteristic of the first image.

9. The system of claim 4, wherein the first search query is received at a first time, and the computer-executable instructions to determine the second search query include computer-executable instructions to:

determine a failure to determine one or more third search queries associated with the first item and further associated with one or more times before the first time;

determine a failure to generate the second search query based on at least one visual characteristic of the first image;

determine text within the first image; and determine the second search query based on the text within the first image.

10. The system of claim 4, wherein the first search query is received at a first time, and the computer-executable instructions to determine the second search query include computer-executable instructions to:

determine a failure to determine one or more third search queries associated with the first item and further associated with one or more times before the first time;

determine a failure to determine text within the first image; and generate the second search query based on at least one characteristic of one or more of the first image or the first item.

11. The system of claim 4, wherein the computer-executable instructions to determine the second search query include computer-executable instructions to:

determine two or more of:
a third search query based on at least one visual characteristic of the first image of the first item;
a fourth search query based on text included in the first image of the first item; or
a fifth search query associated with the first item, wherein the fifth search query was received before the first search query; and determine the second search query based on the two or more of the third search query, the fourth search query, or the fifth search query.

12. The system of claim 4, further comprising computer-executable instructions to:

determine that the first portion of the first result data includes a count of search results that is less than a threshold count;

wherein the second search query is determined in response to the first portion of the first result data including the count of search results that is less than the threshold count.

13. The system of claim 4, further comprising computer-executable instructions to:

determine that the first result data includes a first result that matches a second result included in the second result data;

remove one of: the first result from the first result data or the second result from the second result data; and cause the other of the first result or the second result to be presented prior to at least one other result in the output data.

14. A system comprising:

one or more non-transitory memories storing computer-executable instructions; and one or more hardware processors to execute the computer-executable instructions to:

receive a first query comprising a first image of a first item;

determine first result data based on the first query, wherein the first result data comprises a plurality of first results;

determine, based at least in part on the first image, a second query comprising text;

determine second result data based on the second query, wherein the second result data comprises a plurality of second results;

determine a presentation order for one or more first results of the plurality of first results and one or more second results of the plurality of second results; and determine output data that includes:
the one or more first results of the plurality of first results; and
the one or more second results of the plurality of second results;

wherein the one or more first results and the one or more second results are presented based on the presentation order.

15. The system of claim 14, further comprising computer-executable instructions to:

determine first scores for a first portion of the one or more first results, wherein the first scores for the first portion are greater than a threshold score;

wherein the output data includes the first portion of the one or more first results before the one or more second results and before a second portion of the one or more first results.

16. The system of claim 15, further comprising computer-executable instructions to:

determine second scores for the second portion of the one or more first results, wherein the second scores for the second portion are less than the threshold score;

wherein the output data includes the one or more second results before the second portion of the one or more first results.

17. The system of claim 15, further comprising computer-executable instructions to:

determine that the first portion of the one or more first results includes a count of results that is less than a threshold count;

wherein the second query is determined in response to the count being less than the threshold count.

18. The system of claim 14, wherein the first query is associated with a first time, and the computer-executable instructions to determine the second query include computer-executable instructions to determine one or more of:

a third query associated with the first item, wherein the third query is associated with a second time before the first time;

a fourth query based on at least one visual characteristic of the first image of the first item; or a fifth query based on text included in the first image of the first item.

19. The system of claim 14, wherein the first query is associated with a first time, and the computer-executable instructions to determine the second query include computer-executable instructions to:
  determine two or more of:
    a third query associated with the first item, wherein the third query is associated with one or more times before the first time;
    a fourth query based on at least one visual characteristic of the first image of the first item; or
    a fifth query based on text included in the first image of the first item; and
  determine the second query based on the two or more of the third query, the fourth query, or the fifth query.

20. The system of claim 14, further comprising computer-executable instructions to:
  determine that the first result data includes a first result that matches a second result included in the second result data;
  remove one of: the first result from the first result data or the second result from the second result data; and
  cause the other of the first result or the second result to be presented prior to at least one other result in the output data.

* * * * *